United States Patent [19]

Cornelius

[11] 4,253,483
[45] Mar. 3, 1981

[54] MOVABLE BLADE DAMPER

[75] Inventor: Jack M. Cornelius, Birmingham, Ala.

[73] Assignee: Barron Industries, Inc., Leeds, Ala.

[21] Appl. No.: 923,806

[22] Filed: Jul. 12, 1978

[51] Int. Cl.³ .................. F16K 3/02; F16K 25/04
[52] U.S. Cl. .................... 137/240; 251/134; 251/327; 251/329
[58] Field of Search ............ 251/327, 326, 328, 329, 251/134; 137/240

[56] References Cited

U.S. PATENT DOCUMENTS

| | | | |
|---|---|---|---|
| 2,029,151 | 1/1936 | Bigelow | 251/328 X |
| 2,913,220 | 11/1959 | Cover | 251/328 |
| 2,964,036 | 12/1960 | Lowe . | |
| 2,996,063 | 8/1961 | Lowe . | |
| 3,035,810 | 5/1962 | Lowe et al. | 251/298 |
| 3,069,129 | 12/1962 | Grove | 251/175 |
| 3,206,162 | 9/1965 | Bogot | 251/172 |
| 3,228,389 | 1/1966 | Lowe et al. . | |
| 3,460,457 | 8/1969 | Lowe et al. . | |
| 3,547,140 | 12/1970 | Hastings et al. | 137/240 |
| 3,575,377 | 4/1971 | Carlton | 251/327 X |
| 3,596,874 | 8/1971 | Di Santo | 251/328 X |
| 3,918,471 | 11/1975 | Bedner | 137/240 X |
| 4,022,241 | 5/1977 | Fox | 137/240 |

FOREIGN PATENT DOCUMENTS 1039541 8/1966 United Kingdom ............ 251/327

OTHER PUBLICATIONS

Air Clean Damper Co., Doc. ACA-102-4-75.
Zurn TA Seal Air Guillotine, 12-11-75, Document.
*The Electrostatic Precipator Manual*, McIlvaine Co., pp. 112.1-112.5.

Primary Examiner—Arnold Rosenthal
Attorney, Agent, or Firm—Hume, Clement, Brinks, Willian & Olds, Ltd.

[57] ABSTRACT

In a damper having an opening therethrough, an aperture defining blade member is movable between a first position, in which the aperture is aligned with the opening to permit the flow of fluid through the damper, and a second position, in which the blade member substantially blocks the flow of fluid through the damper opening. A sealing member is located around the periphery of the opening adjacent the blade member to substantially abut the blade member in both the first and second blade positions. A pressurized fluid such as air is supplied to the sealing member to promote flow of fluid between the sealing member and the blade member into the opening, and thereby substantially to prevent the leakage of fluid out of the opening between the blade member and the sealing member.

3 Claims, 5 Drawing Figures

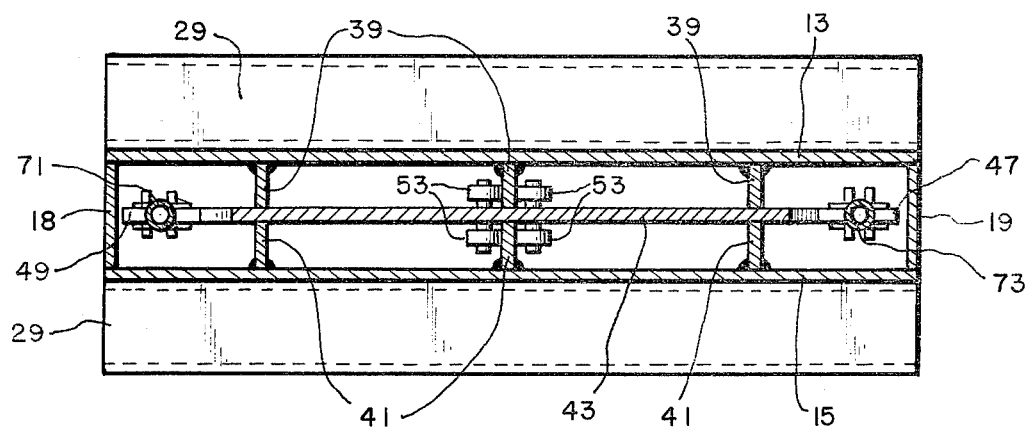
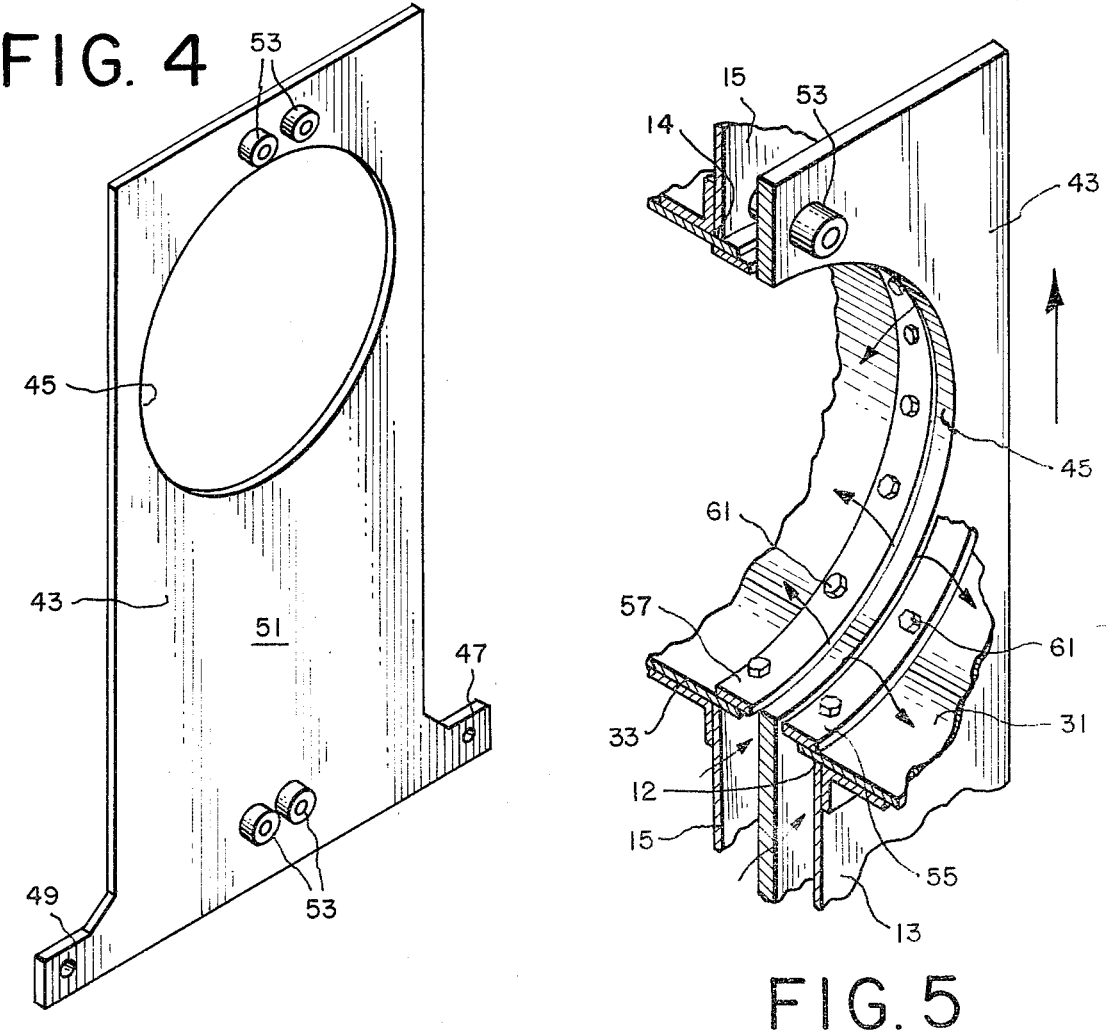

MOVABLE BLADE DAMPER

BACKGROUND OF THE INVENTION

The present invention relates to dampers for controlling the flow of fluid and more particularly to dampers of this type which employ a sliding blade member to substantially prevent the flow of fluid through a duct.

Dampers having sliding blade members have long been used to control the flow of fluids such as flue gases. For example, U.S. Pat. No. 3,728,389 (Lowe, et al,) discloses a damper having a movable curtain provided with spring seals for sealing the curtain against a frame when the curtain is drawn to extend across the frame.

Several dampers of the prior art have employed movable gates which can be positioned across a conduit to obstruct it. U.S. Pat. No. 3,069,129 (Grove), U.S. Pat. No. 3,206,162 (Bogot), U.S. Pat. No. 3,460,457 (Lowe, et al.), and U.S. Pat. No. 3,596,874 (DiSanto) provide examples of these sliding gate dampers. In each case the gate travels in guides which are open to the fluid flowing through the conduit when the damper is open. In some, such as Lowe and DiSanto, sealing is provided by resilient seals between the gate and the damper.

A third approach to the sliding blade damper is disclosed in U.S. Pat. No. 3,575,377 (Carlton) which shows a sliding blade member having an aperture defining open section and an imperforate closed section. The damper is opened or closed by appropriate positioning of the blade in the damper.

These and other sliding blade dampers of the prior art exhibit certain disadvantages which can be especially significant in applications which require substantially zero leakage in the presence of fly ash or other particulate matter. Such requirements are becoming increasingly widespread, especially in conjunction with flue gas dampers. Pollution control equipment is increasingly being used to process flue gas before it is released to the atmosphere. This equipment of course requires servicing, and it is often desirable to provide a damper capable of preventing substantially all flue gas from reaching the equipment while it is being serviced. In some cases, federal government regulations may require such dampers in order to protect personnel working in the duct. It is important that such dampers function reliably without leakage, binding, or jamming in an environment that includes large quantities of fly ash and other particulate matter.

Fly ash can build up as a cement-like mass on spring seals, thereby preventing complete sealing. Furthermore, when guides are exposed to fly ash for extended periods, as in the gate dampers described above, the build-up of fly ash can cause binding and incomplete closing of the gate in the damper. Seals, such as those used by Carlton, which are made of materials which can be damaged by high temperatures are unsuitable for many high temperature applications.

SUMMARY OF THE INVENTION

The present invention is directed to an improved sliding blade damper that is less subject to these and other drawbacks of the prior art. The damper of this invention includes an aperture defining blade member movable between a first position, in which the aperture is aligned with an opening in the damper and fluid can pass through the damper via the opening and the blade aperture, and a second position, in which the blade member substantially blocks fluid flow through the damper. A sealing member is located about the periphery of the opening adjacent the blade member, and is positioned to substantially abut the blade member in both the first and second blade positions. Pressurized fluid is supplied to the sealing member to promote flow of fluid between the sealing member and the blade member into the opening, and thereby substantially to prevent the leakage of fluid out of the opening between the blade member and the sealing member.

In that the sealing member provides a seal between the blade member and the damper both when the blade is in the open and closed positions, the sealing member is less exposed to fly ash build-up and concomittant leakage and binding. The seals and blade guides of the damper of the present invention are not left unprotected when the blade is in the open position, and fly ash build-up is, therefore, reduced.

The flow of pressurized fluid into the damper opening ensures that substantially no fluid leaks across the blade member when it is in the closed position. Furthermore, the sealing members can be made of substantially rigid materials, in which case the scraping action of the moving blade member across the sealing members tends to remove fly ash build-up from the sealing members.

The novel features of the invention, together with further objects and attendant advantages, will be best understood by reference to the following description taken in connection with the accompanying drawings.

BRIEF DESCRIPTION OF THE DRAWINGS

FIG. 3 is a cross-sectional view taken along line 3—3 of FIG. 1.

FIG. 4 is a perspective view of a component element of the damper of FIG. 1.

FIG. 5 is a perspective sectional view in partial cutaway taken along line 5—5 of FIG. 1.

DETAILED DESCRIPTION OF A PREFERRED EMBODIMENT

Figure 1:
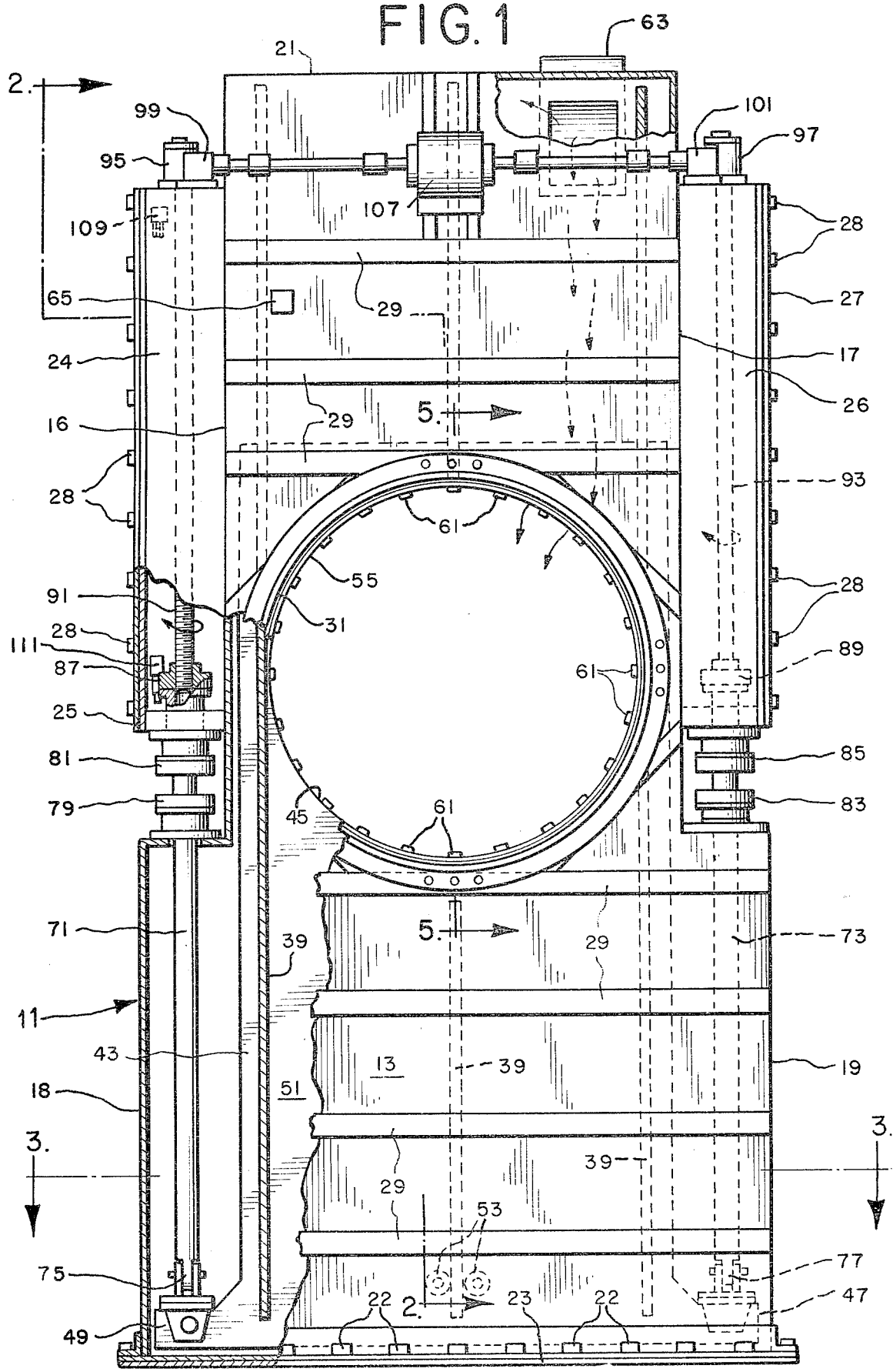
FIG. 1 is a plan view in partial cutaway of a preferred embodiment of the damper of this invention.
Figure 2:
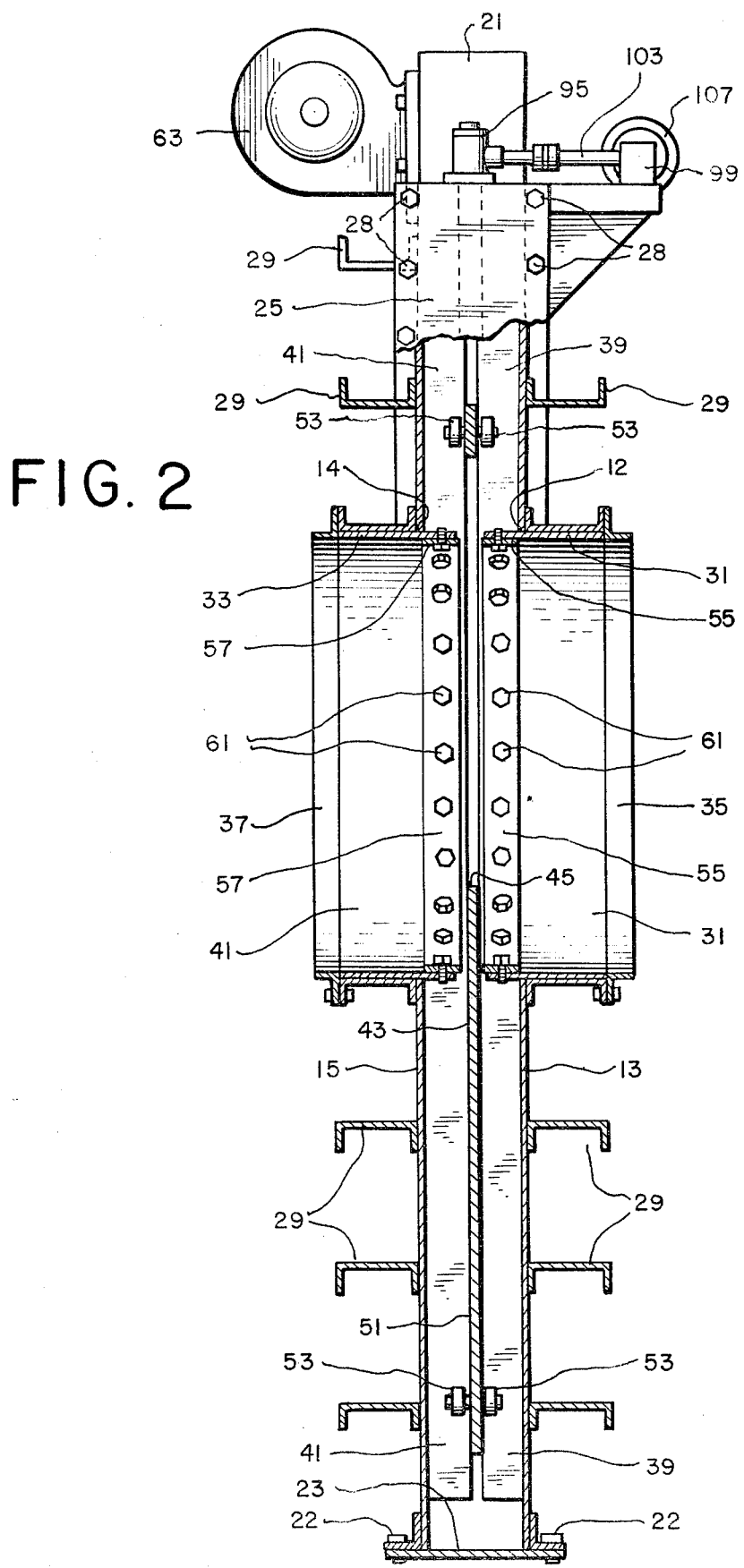
FIG. 2 is a cross-sectional view of the damper of FIG. 1 taken along line 2—2 of FIG. 1.

Referring now to the drawings, FIGS. 1 and 2 show plan and cross sectional views of a preferred embodiment of the damper of the present invention. This damper includes three major assemblies: a frame which forms a pressure chamber, a blade which slides within the frame, and means for moving and holding the blade to the desired position within the frame.

The frame 11 is a box-like structure made up of front and back plates 13,15, two upper side plates, 16,17, two lower side plates 18,19, a top plate 21 and a bottom plate 23. Plates 13-21 of the frame 11 are secured together in a substantially air tight manner, as by welding, for example. The bottom plate 23 with gasket is held in place by a plurality of fasteners such as bolts 22 and can be removed when necessary for access to the interior of the frame 11. Two screw chambers 24,26 are mounted on the upper side plates 16,17, respectively, and are isolated from the interior of the frame 11 by the upper side plates 16,17. Each screw chamber 24,26 is provided with a removable side cover plate 25,27 held in place by fasteners such as bolts 28. Bracing bars 29 are secured as by welding to the front and back plates 13,15 to increase the rigidity of these plates.

A large opening 12,14 is centrally formed in each of the front and back plates 13,15. Front and back tubular duct members 31,33 are secured to the front and back plates 13,15 around the openings 12,14, respectively. Each duct member 31,33 is provided with a flange 35,37 sized for connection to a pair of axially aligned, spaced apart ducts (not shown). The duct members 31,33 extend into the interior of the frame 11 so as to almost meet in the center and are axially aligned to form an opening extending through the frame 11.

As best seen in FIG. 3, guide rails 39,41 are mounted in the interior of the frame 11 and are secured to the front and back plates 13,15 so as to extend substantially parallel to the side plates 16–19. Two sets of guide rails 39,41 are provided, one in the region of the frame bounded by the upper side plates 16,17 and one in the region bounded by the lower side plates 18,19. In this preferred embodiment the guide rails 39,41 do not extend across the openings 12,14.

A substantially rigid blade 43 is movably mounted inside the frame 11 between the guide rails 39,41. FIG. 4 is a perspective view of the blade 43. There it can be seen that the blade 43 is provided with an aperture 45 corresponding in size, shape, and lateral position to the inner diameter of the duct members 31,33. The blade 43 further includes an imperforate section 51 adjacent the aperture 45. Section 51 is sized somewhat larger than the aperture 45. Lifting tabs 47,49 are formed in the end of the blade 43 adjacent the imperforate section 51, and guide rollers 53 are centrally mounted near each end of the blade 43. When the blade 43 is in place inside the frame 11, the rollers 53 are positioned on either side of the central guide rails 39,41, as shown in FIG. 3. Thus, in the assembled damper, the blade 43 is laterally positioned by the guide rollers 53 in one dimension and by the upper and lower guide rails 39,41 in a second dimension.

The damper of this invention is suitable for use with large ducts having a diameter in excess of five feet. In the following description exemplary dimensions will be provided for a damper having an opening 12,14 sixty-six inches in diameter.

For example, the separation between the opposing guide rails 39,41, for a damper of this size is preferably about one-quarter inch greater than the thickness of the blade 43, and the separation between opposing guide rollers is about one-quarter inch greater than the thickness of the central guide rails. These separations have been found to provide an adequate clearance to substantially eliminate binding while providing adequate guidance.

Turning now to FIG. 5, the sealing arrangment between the blade 43 and the front and back duct members 31,33 includes front and back seal bars 55,57, which are mounted on the front and back duct members 31,33, respectively, adjacent the blade 43. Each seal bar 55,57 is formed in a ring having an inner diameter substantially equal to that of the aperture 45 in the blade 43. The seal bars are preferably made of a corrosion-resistant metal such as a stainless steel, and should have a thickness large enough to ensure substantial rigidity of the seal bar. In this preferred embodiment the seal bars 55,57 are metal strips formed into rings having a thickness of about three-eighths of an inch.

Each seal bar 55,57 is provided with an array of elongated holes or slots through which fasteners such as bolts 61 are passed to secure the seal bars 55,57 to the front and back duct members 31,33, respectively. The slots permit the seal bars 55,57 to be positioned on the duct members 31,33 to achieve the desired separation between the seal bars 55,57 and the blade 43. In this preferred embodiment the spacing between each of the seal bars 55,57 and the blade 43 is preferably set to about one-sixteenth of an inch to allow for thermal growth and distortion without undue binding.

This preferred embodiment employs a metal-to-metal seal which is durable and well suited for applications involving high temperatures as well as abrasive particles such as fly ash. In low temperature environments where it is possible to use elastomers the seal between the blade 43 and the duct members 31,33 can include an elastomeric seal ring positioned to abut the blade 43. Such elastomeric seals could be held in position on the duct members 31,33 by a clamping ring and could be made of a suitable commercially available elastomeric compound such as silicone rubber or Viton.

When assembled, the blade 43, seal bars 55,57, and frame 11 cooperate to form a pressure chamber which can be pressurized to substantially eliminate leakage across the damper when the damper is closed. A blower 63 is provided to pressurize air in the frame 11, and a pressure switch 65 is provided to measure the internal pressure.

The blade 43 is moved inside the frame 11 by a positioning apparatus that includes two connecting pipes 71,73 which are secured to the lifting tabs 49,47 by pivotable connections 75,77, respectively. These pipes 71,73 are preferably formed from a corrosive-resistant material such as stainless steel, and each is laterally positioned by a pair of combination guide gushings and stuffing boxes, 79,81 and 83,85, respectively, which substantially eliminate the leakage of fluid out of the frame 11 around the connecting pipes 71,73. Each connecting pipe 71,73 terminates with a traveling nut 87,89, which is mounted on a lead screw 91,93, respectively. As best shown in FIGS. 1 and 2, each lead screw is rotated by a screw jack 95,97 which is in turn coupled to a right angle gear box 99,101 by a shaft 103,105, respectively. The right angle gear boxes 99,101 are driven by an electric motor 107. Limit switches 109,111 (FIG. 1) are used in a well-known manner to prevent the motor 107 from driving the traveling nut 87 beyond predetermined limits.

In operation the damper of this invention provides substantially zero leakage when the blade 43 is in the closed position. Little maintenance is required and the damper is well suited for use in applications involving suspended particles such as fly ash in the fluid passing through the damper.

The motor 107 is used to turn the lead screws 91,93 to bring the blade 43 to the desired position in the frame 11. Preferably the damper is used in a vertical position with the top plate 21 uppermost; however, other damper orientations including a horizontally mounted damper may be used as well. In the following description it is assumed that the damper is mounted in the preferred orientation with the blade 43 in a substantially vertical plane and the top plate 21 uppermost.

The blade 43 can be positioned in a lower position in which the aperture 45 is aligned with the duct members 31,33. In this position the duct members 31,33, the seal bars 55,57, and the blade 43 cooperate to form an opening extending through the frame 11. In this position fluid flowing through the opening encounters a minimal restriction. In that the pressure chamber formed by the frame 11 is closed, there is little flow of fluid between the seal bars 55,57 and the blade 43 into the interior of the frame 11, and thus little fly ash or other particulate matter is carried into the frame 11. Material that does enter the frame 11 can be removed by way of the removable lower plate 23.

In order to block the flow of fluid between the first and second duct members 31,33 the motor 107 can be used to raise the blade 43 to an upper position in which the imperforate region 51 is positioned adjacent the seal bars 55,57. In this position the blade 43 entirely blocks the opening in the frame 11.

In order to improve sealing, the blower 63 is operated to maintain the pressure in the pressure chamber defined by the frame at a higher level than that of the interior of the duct members. Preferably the pressure inside the frame 11 is three to four inches of water column higher than the duct pressure inside the duct members. This ensures that fluid from the damper frame 11 leaks into the duct members 31,33 instead of the reverse. The blower is preferably operated whenever the blade 43 is in the upper, or closed, position and whenever the blade is in an intermediate position between the upper and lower positions. In this way leakage from the duct members into the frame 11 and the accumulation of solid matter in the frame 11 is reduced. Leakage and accumulation can be further reduced by operating the blower 63 whenever a positive pressure exists in either of the duct members 31,33.

Pressurized fluid such as air inside the frame 11 serves to eliminate substantially all leakage from one duct member 31,33 to the other when the blade 43 is in the closed position. Because the frame 11 forms a closed pressure chamber and the stuffing boxes 79-83 eliminate substantially all fluid flow out of the frame 11, the fluid flow into the frame 11 is low, even when the blower 63 is not operating. However, when the blower 63 is operating, leakage out of the duct members is substantially eliminated. The leakage between duct members 31,33 is further reduced in that fluid would first have to leak from one duct member into the frame 11 and then out of the frame into the other duct member in order to bypass the damper. The pressure switch 65 can be used as an alarm to sense inadequate pressure in the pressure chamber of the frame 11 and the potential increases in the leakage rate of the damper.

The damper of the preferred embodiment is readily accessible for maintenance. No motors, gear boxes, or lead screws are located in the interior of the frame 11, and thus, all are well protected from fly ash or other particulate matter which may find its way into the frame 11. The connecting pipes 71,73 are made of a corrosion resistant steel and do not require a rubber boot for protection from the environment of the interior of the frame 11. In that the blade 43 is in the lower position when the damper is open, the blade can be braced and the lead screws 91,93 and associated gear boxes can be readily removed for servicing without removing the damper from service. When mounted in the preferred vertical position the lead screws 91,93 and connecting pipes 71,73 are maintained in tension, and column buckling is avoided. Since the connecting pipes 71,73 are positioned in the plane of the blade 43, the blade 43 is supported without undesirable twisting movements.

The damper of this invention is designed to operate reliably in a fly ash environment with a minimum of jamming, wedging, and leakage due to fly ash build-up on sealing and guiding surfaces. In this context, one important feature of this invention is that the seal bars 55,57 are positioned adjacent the blade 43 both when the blade 43 is in the open and the closed position. Thus, build-up of fly ash on the seal surfaces is controlled for the great majority of the time the damper is in use.

Additionally, the seal bars 55,57 are made of a rigid material rather than resilient materials used in the spring seals and flap seals of the prior art. Since the seal bars 55,57 are substantially rigid, the movement of the blade 43 against the seal bars 55,57 acts to scrape off accumulated fly ash. The thickness of the seal bars 55,57 should be chosen to be great enough to provide the desired rigidity but small enough to limit any build-up of fly ash to a small cross section which can be scraped away by the blade. In practice, a seal bar thickness of three-eighths of an inch has been found to work well, but it is expected that other dimensions in the range of one-quarter to one-half inch or even three-quarter inch may be used as well. Of course, the seal bar thickness will vary according to the rigidity of the material used to make up the seal bar and the operating conditions in which it will be used. For similar reasons, the guide rails 39,41 are preferably formed with a narrow cross section to reduce fly ash build-up.

In that the seal bars and guide rails are proportioned to minimize fly ash build-up and seal surfaces are maintained in close proximity to the blade whenever the blade is in either the open or closed position, damper binding and leakage due to fly ash build-up are substantially eliminated.

Another feature of this damper is improved resistance to fly ash obstruction of blade positioning. In the preferred orientation the blade is raised to close the damper. Fly ash may settle in the lower portion of the duct members 31,33 adjacent and over the blade, and in some cases may form a hard, cement-like mass. When the blade is moved to close the damper, it moves upward, pulling the fly ash upward, away from the duct members 31,33. In contrast, many dampers of the prior art have lowered a blade into a duct to close the damper. The descending blade may tend to come to rest on the upper portion of the accumulated fly ash rather than breaking through it to reach the lower seals. The damper of the present invention has shown an improved ability to dislodge accumulated fly ash and to provide a satisfactory seal in a fly ash environment.

Of course, it should be understood that various changes and modifications to the preferred embodiment described herein will be apparent to those skilled in the art. For example, the dimensions and materials of the damper can be chosen to suit the intended application. Such changes and modifications can be made without departing from the spirit and scope of the present invention. It is, therefore, intended that such changes and modifications be covered by the following claims.

I claim:

1. A flue gas damper comprising:

first and second axially aligned, spaced apart tubular duct members;

a pressure chamber surrounding the adjacent ends of the first and second duct members;

a blade member located between the first and second duct members within the pressure chamber, said blade member being substantially planar and having an aperture defining a first section and an imperforate second section;

first and second lifting members secured to opposed edges of the blade member, each lifting member having a first end secured to the blade member and a second end extending out of the pressure chamber in the plane of the blade member;

means, situated outside the pressure chamber, for positioning the first and second lifting members and thereby the blade member between a first position, in which the blade aperture is aligned with the first and second duct members, and a second position, in which the imperforate second section is aligned with the first and second duct members;

first and second substantially rigid sealing strips mounted adjacent the blade member and the first and second duct members, respectively, at a substantially fixed separation adequate to prevent binding between the blade member and the sealing strips, said sealing strips having a hardness and a rigidity adequate to substantially prevent buildup of hardened fly ash between the blade member and the sealing strips, said blade member cooperating with the sealing strips to maintain the sealing strips adjacent the blade member when the blade member is positioned in both the first and second positions; and means, mounted exterior to the pressure chamber, for pressurizing the chamber with air to promote passage of air out of the chamber between the sealing strips and the blade member into the duct members, thereby substantially preventing the leakage of flue gas from the first to the second duct member when the blade member is in the second position.

2. The flue gas damper of claim 1 wherein each of the first and second sealing strips comprises an annular metal ring having a thickness greater than about one-quarter inch and less than about three-quarter inch.

3. The flue gas damper of claim 1 wherein at least one of the sealing strips is provided with an array of elongated slots and said at least one sealing strip is adjustably mounted by means of threaded fasteners which pass through the elongated slots, such that the separation between said at least one sealing strip and the blade member is adjustable.

* * * * *